(No Model.)

C. F. LAVENDER.
AXLE BEARING FOR WHEELS.

No. 510,179. Patented Dec. 5, 1893.

Witnesses,
C. L. Lawrie.
L. Foulds.

Inventor,
C. F. Lavender
by C. H. Rickes
his attorney

UNITED STATES PATENT OFFICE.

CHARLES F. LAVENDER, OF TORONTO, CANADA, ASSIGNOR OF ONE-HALF TO THOMAS FANE, OF SAME PLACE.

AXLE-BEARING FOR WHEELS.

SPECIFICATION forming part of Letters Patent No. 510,179, dated December 5, 1893.

Application filed April 29, 1893. Serial No. 472,441. (No model.)

*To all whom it may concern:*

Be it known that I, CHARLES F. LAVENDER, manufacturer, of the city of Toronto, county of York, Province of Ontario, Canada, have invented certain new and useful Improvements in Axle-Bearings for Wheels; and I hereby declare that the following is a full, clear, and exact description of the same.

This invention relates to an axle bearing for all classes of wheels, and relates more particularly to an axle bearing for that class of vehicles known as bicycles, which requires to be so made that the friction on the different bearings will be reduced to the lowest possible degree that it will amount to *nil;* and the object of the invention consists in so constructing the axle bearing that it can be readily detached from the vehicle when necessary so to do, for cleaning or repairing purposes, and also to so construct the bearing that in the event of a strain or bend of the frame work the axle bearing can be easily righted or will regain its normal position on loosening the set screw and the bearing balls will be relieved from binding against their bearing surfaces and the wheel will be permitted to run easily on its bearings; and the invention consists essentially of the device hereinafter more fully set forth in the specification and more particularly pointed out in the claim.

Figure 1:
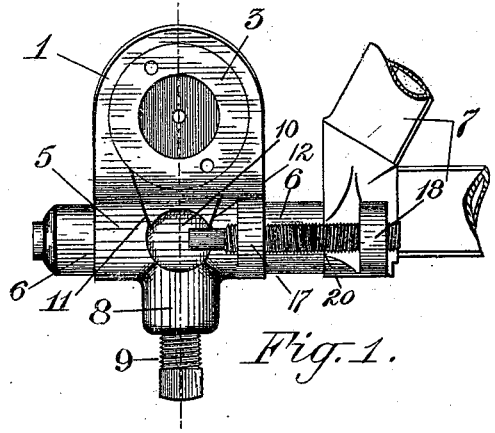
Figure 2:
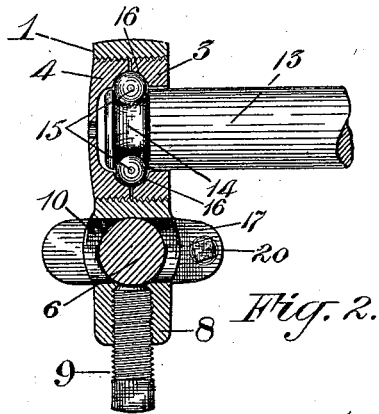
Figure 3:
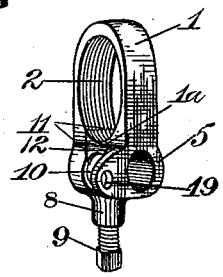

In the drawings:—Figure 1 is a side elevation of the axle bearing. Fig. 2 is a sectional view of the same. Fig. 3 is a perspective view of the bearing case.

Like numerals of reference refer to like parts throughout the specification and drawings.

The invention consists essentially of a bearing case 1, having a threaded opening 2 formed therein to receive the adjusting cones respectively 3 and 4. Connected to the lower extremity of the bearing case 1 is a collar 5 fitted to the shank 6 of the frame 7. The collar 5 is provided with a lug 8 having a threaded passage formed therein to receive the set screw 9 which bears against the shank 6 and binds the collar 5 to the said shank.

Formed in the side of the collar 5 from the outer to the inner circumference is an opening 10 which consists of a piece of the said collar being cut away. The metal of the bearing case 1 from the opening 10 to the opening 2 has formed through it a saw cut 11 and from the opening 10 partially through the said portion of the metal of the bearing case is a second saw cut 12. The rough forgings for the bearing case and collar have a rough hole less than the diameter of what the opening 2 is to be when the bearing case is finished and the saw cuts respectively 11 and 12 are made in the first instance and the piece of metal 1ª between these saw cuts and the openings 2 and 10 is displaced or knocked downward into the opening 10 about one-sixteenth of an inch. The opening 2 is then bored or reamed out to the required size and screw threaded. The object of making the bearing case by this method is to make the opening 2 perfectly circular and to provide at the same time a lock which will bear against the adjusting cones respectively 3 and 4, which lock is formed integral with the remaining parts of the bearing case. The adjusting cones 3 and 4 are of a size to fit into the screw threaded opening 2 and are screw threaded on their peripheries to engage with the screw threaded surface of the said opening. The recesses of each of the adjusting cones 3 and 4 are oppositely opposed to each other and formed through the wall of the inner cone 3 is a circular opening which is struck with the center of the said cone as its center to permit of the axle 13 passing therethrough. The axle 13 is provided with a circumferential groove 14 in which run the bearing balls 15. Each of the adjusting cones 3 and 4 is provided with a bearing surface 16 for the balls 15. Between the axle and the adjusting cones is sufficient clearance to permit of the rotation of the axle without wearing on the said cones and causing unnecessary friction.

Formed on the collar 5 is a lug 17 and formed on the frame 7 is a lug 18. Each of the lugs 17 and 18 is provided respectively with a hole or opening 19 therethrough which passes a right and left threaded screw 20 for the purpose of longitudinally adjusting the bearing case and the collar along the shank 6. The bearings on the driving wheel are the only bearings which are fitted with these adjusting screws as the adjusting cones are merely employed for the purpose of tightening and slackening the driving chain. By means of a device of this description the axle bearings can be instantaneously righted in the event of a bend or fracture occurring to the frame of the vehicle, and by so righting the bearings the unnecessary friction and binding of the axle on its bearings will be entirely obviated. This lock it will be noticed forms part of the bottom seat of the bearing case and by being raised by the pressure of the set screw securely holds the adjusting cones.

Having thus fully described my invention, what I claim as new, and desire to secure by Letters Patent, is—

The combination of a bearing case 1, having a threaded aperture formed therethrough, the adjusting cones within the threaded aperture, a collar 5 secured to the bearing case 1 and fitted to receive the shank of the frame, means for securing the collar to the shank said collar having an opening formed in the side, a movable piece of metal 1ª located between the threaded aperture and opening in the collar hinged to the bearing case and adapted to bear against the adjusting cones and form a lock therefor.

Toronto, March 22, 1893.

C. F. LAVENDER.

In presence of—
C. H. RICHES,
M. E. ANGELL.